United States Patent Office 2,904,430
Patented Sept. 15, 1959

2,904,430

PURIFICATION OF REFRACTORY METALS

Donald F. Taylor, Waukegan, Robert L. Baughman, Zion, and Leonard F. Yntema, Wadsworth, Ill., assignors to Fansteel Metallurgical Corporation, a corporation of New York No Drawing. Application October 14, 1957
Serial No. 689,769

15 Claims. (Cl. 75—200)

This invention relates to a method of sintering and purifying refractory metals and particularly in treating a refractory metal which contains as an impurity an amount of a metal which prevents the resulting sintered refractory metal from being sufficiently ductile to be worked, whereby such an embrittling quantity of metal is removed during sintering so that the resulting sintered refractory metal is sufficiently ductile to be worked.

This application is a continuation-in-part of United States patent application Serial Number 239,395, filed July 30, 1951, now abandoned, and our copending United States patent application Serial Number 545,554, filed November 7, 1955, now abandoned.

In the case of refractory metals, such as tantalum, columbium, tungsten, molybdenum and the like, it is common practice to press the refractory metal powder in the form of a bar and then sinter the pressed bar. In the process of making the refractory metal powder, the powder, on occasion, contains as an impurity a metal, such as for example aluminum, in an amount which prevents the resulting sintered refractory metal from being sufficiently ductile to be worked, and the embrittling quantity of such metal cannot be removed even when sintering under high vacuum conditions over long periods of time.

In the case of tantalum, for example, the amount of metal impurity which does not volatilize at the sintering temperature of the refractory metal and which causes embrittlement is in excess of about 0.5% by weight, and may be as much as about 2% by weight. For reasons unknown to us, when the metal impurity is present in an amount below about 0.5% by weight it does not cause embrittlement. This is also true for such other refractory metals as columbium, molybdenum and tungsten. When these refractory metals contain embrittling amounts of metal impurity, the metal impurity should be reduced to amounts below about 0.5% and preferably to amounts below about 0.2%, thereby eliminating the embrittling effect. It is preferred that the metal impurity be reduced to about 0.02% by weight or less.

In general, it is desirable to make a preliminary test to determine whether the refractory metal contains an embrittling quantity of a metal impurity which does not volatilize at the sintering temperature of the refractory metal. Such a test comprises forming a test bar from the refractory metal powder containing the said metal impurity in the form of a compact under 15 tons/in.$^2$ pressure; heating the compact at the sintering temperature of the refractory metal to form a sintered bar; and then attempting to work the bar under normal procedures such as, for example, rolling. If the bar contains an embrittling quantity of the said metal impurity, it will break upon rolling and the remainder of the powder of the refractory metal should then be treated in accordance with our new method set forth herein.

We have discovered that under such conditions the embrittling quantity of metal impurity, such as aluminum, may be removed by mixing a powder of the refractory metal, such as tantalum, columbium, molybdenum, tungsten and the like, containing this embrittling quantity of the metal impurity with a small proportion of a powder of a third metal, such as for example copper, silver, or gold, which volatilizes at the sintering temperature of the refractory metal, does not alloy with the refractory metal, and volatilizes off with the embrittling quantity of the metal impurity to render the sintered metal sufficiently ductile to be worked.

Following is a detailed description of our new method with reference specifically to the sintering and purification of tantalum and columbium metals which contain in the powder form as an impurity an amount of aluminum which prevents the resulting sintered tantalum or columbium metal from being sufficiently ductile to be worked, whereby such an embrittling quantity of aluminum is removed during sintering so that the resulting sintered tantalum or columbium metal is sufficiently ductile to be worked.

It is to be understood that the new method is applicable to other refractory metals, such as molybdenum, tungsten, and the like, as well as tantalum and columbium which contain an embrittling quantity of a metal impurity other than aluminum in which a third metal volatilizes at the sintering temperature of the refractory metal, does not alloy with the refractory metal and volatilizes off with the embrittling quantity of the metal impurity.

In the case of tantalum or columbium, these metals cannot be recovered from tantalite, columbite and similar ores by a smelting process, nor can they be obtained by a reduction of the oxides with hydrogen. Under the present process these ores are fused with caustic soda to convert the tantalum or columbium into crude sodium tantalate and sodium columbate mixed with a number of impurities. After cooling, the fused mass is crushed and the water soluble impurities removed by leaching with water. The acid soluble impurities are then removed by treating the mass with hot hydrochloric acid. This converts the sodium tantalate and sodium columbate into insoluble tantalic and columbic acids. This mixture of acids is then dissolved in hot hydrofluoric acid. Potassium carbonate is then added to form the double salts, potassium tantalum flouride and potassium columbium oxyfluoride. The hot solution is then cooled. The potassium tantalum fluoride crystallizes out leaving the potassium columbium oxyfluoride in solution. The crystallized tantalum salt is separated from the solution, washed and dried and the columbium salt is recovered from the solution. The pure tantalum and columbium metals are obtained from the double fluorides by electrolysis of the respective fused salts, the metal becoming dispersed as fine grains or powder in the salt mass as electrolysis progresses. After electrolysis, the salt mass is crushed and the metal recovered from the crushed mass.

The electrolysis of the fused tantalum or columbium salts is a costly operation. In our co-pending United States patent applications, Serial Number 689,766, filed October 14, 1957, and Serial Number 682,287, filed September 6, 1957, we have disclosed and claimed new methods of recovering the tantalum or columbium powder which omit the costly electrolysis step. These methods include treating, for example potassium tantalum fluoride or potassium columbium oxyfluoride, with (1) aluminum or (2) an excess of an alloy of aluminum and copper, silver or gold.

In the first of these methods, i.e., the treatment of the double salt of tantalum or columbium with aluminum, the aluminum reacts with the double salt to form an intermetallic compound or alloy or columbium or tantalum and the aluminum. This intermetallic compound or alloy is then reacted with copper, silver or gold.

When copper is used, an aluminum-copper alloy is formed together with tantalum or columbium in a reaction mixture in which the tantalum or columbium is in the form of finely divided grains dispersed throughout the mixture and in a substantially pure state. The tantalum or columbium grains are then separated from the reaction mixture.

In the other method, the reaction of an excess of aluminum-copper alloy with potassium tantalum fluoride or potassium columbium oxyfluoride, a reaction mixture is formed which includes an alloy of aluminum and copper; tantalum or columbium in the form of finely divided particles or grains dispersed throughout the metal portion of the reaction mixture in a substantially pure state; and aluminum fluoride and potassium fluoride as slag.

Under certain conditions, the resulting tantalum or columbium powder separated from the above reaction mixtures has been found to contain an amount of aluminum which prevents the resulting sintered tantalum or columbium from being sufficiently ductile to be worked, even when the sintering is conducted for a long period of time under high vacuum conditions. The amount of aluminum present may be as much as about 2% by weight. If the amount of aluminum exceeds about 0.5% by weight the refractory metal will be too brittle to be worked.

We have discovered that upon adding and mixing with finely divided particles of such tantalum and columbium powder, finely divided copper, silver or gold and sintering the columbium or tantalum powder containing the fienly divided particles of copper, silver or gold at a temperature of at least the sintering temperature of tantalum or columbium, the copper, silver or gold volatilizes off with the embrittling quantity of aluminum to render the sintered metal sufficiently ductile to be worked. The quantity of aluminum in the refractory metal powder is thus reduced to an amount less than about 0.5% and usually to an amount less than about 0.2%. The quantity of aluminum is often reduced to about 0.02% or less. It is preferred that the amount of aluminum be reduced to less than about 0.2%, but even as much aluminum as up to about 0.5% may be present without rendering the refractory metal too brittle to be worked.

The addition of a small amount of copper, silver or gold, i.e., an amount of copper, silver or gold up to about 10% by weight, and usually from about 1% to 5%, to the tantalum or columbium powders containing an embrittling quantity of aluminum of from about 0.5% to about 2% by weight or more, results in the removal of the embrittling quantity of aluminum during sintering so that the resulting sintered bar of columbium or tantalum is comparable to those produced commercially by the usual production methods. The copper, silver or gold does not alloy with tantalum or columbium and is volatilized at temperatures appreciably below the sintering temperature of these metals, i.e., about 2000° C. to 2100° C. for tantalum and about 1800° C. for columbium.

The copper, silver or gold metal powder appears to perform a two-fold function. Each insures a reduction of an embrittling quantity of aluminum-tantalum or aluminum-columbium intermetallic compound or alloy remaining in the powder to tantalum or columbium and an aluminum-copper alloy which is readily volatilized. In addition, the copper, silver or gold also functions to impart and maintain sufficient porosity during the initial stages of the sintering operation so as to permit volatilization of the copper, silver or gold and removal of the embrittling quantity of aluminum therewith. The sintering procedure may be in accordance with conventional sintering practice.

By reduction of the quantity of aluminum-tantalum or aluminum-columbium intermetallic compound or alloy and by maintaining sufficient porosity to permit volatilization of the added copper, silver or gold along with the embrittling quantity of aluminum, the embrittling quantity of aluminum is removed, rendering the resulting sintered bar comparable in physical and mechanical characteristics to a sintered bar produced by conventional production methods when employing tantalum or columbium powder which does not contain an embrittling quantity of aluminum. Following are examples illustrative of our new method:

Tantalum powder is prepared from potassium tantalum fluoride by first reducing the double fluoride with aluminum, followed by reaction of the resulting aluminum-tantalum intermetallic compound or alloy with copper. The resulting ingot includes an aluminum-copper alloy having tantalum particles dispersed therethrough. The tantalum is recovered from the ingot by treating the ingot with hydrochloric acid and washing and drying the tantalum powder. This powder contains the following impurities:

|  | Percent |
|---|---|
| Carbon | 0.22 |
| Iron | 0.05 |
| Tungsten | 0.032 |
| $TiO_2$ | 0.01 |
| $SiO_2$ | 0.70 |
| Copper | 0.70 |
| Aluminum | 0.87 |

Following are examples of bars made from this powder which are pressed, sintered and cold rolled:

Bar 1

69.6 grams of the tantalum powder is pressed in the form of a bar under 55 tons per square inch pressure. This pressed bar has the following dimensions:

| Thickness: | Inches |
|---|---|
| End | 0.234 |
| Center | 0.237 |
| End | 0.241 |
| Width: | |
| End | 0.254 |
| Center | 0.256 |
| End | 0.257 |
| Length | 6.03 |

The resulting pressed tantalum bar is sintered under a vacuum condition of approximately 2.5 microns. It requires 110 minutes to heat the bar to a temperature of 2010° C. Upon reaching this temperature, the bar bulges and a portion melts.

*Results.*—The hardness of this bar after sintering is Rockwell $E=116$. (It is to be noted that a tantalum bar having a hardness of $R_e=116$ is much too hard to be cold worked.)

Analysis of the sintered bar shows that the carbon, $SiO_2$ and copper contents are reduced materially: Carbon to about 0.00%, $SiO_2$ to about 0.15%, and copper to about 0.014%. The tungsten content is reduced slightly (to about 0.025%). However, the aluminum content in the sintered bar is substantially the same as was present before sintering.

Upon attempting to cold roll the sintered bar, it breaks.

Bar 2

64.6 grams of the tantalum powder is pressed in the form of a bar under 15 tons/in.² This pressed bar has the following dimensions:

| Thickness: | Inches |
|---|---|
| End | 0.273 |
| Center | 0.277 |
| End | 0.286 |
| Width: | |
| End | 0.255 |
| Center | 0.254 |
| End | 0.254 |
| Length | 6.03 |

The resulting pressed tantalum bar is sintered under a vacuum condition of approximately 3.0 microns. It is heated to a temperature of about 2100° C., held at this temperature for 15 minutes, heated to a temperature of 2175° C. and held at this temperature for 10 minutes, heated to a temperature of 2300° C. and held at this temperature for 5 minutes, and then heated to a temperature of 2425° C., at which temperature the bar bulges and a portion melts.

*Results.*—The hardness of this sintered bar is $R_e$=95. (It is to be noted that a tantalum bar having a hardness of $R_e$=95 is much too hard to be cold worked.)

Analysis of the sintered bar shows that the carbon, $SiO_2$ and copper contents are reduced materially: Carbon to about 0.00%, $SiO_2$ to about 0.23%, and copper to about 0.015%. The tungsten content is reduced slightly (to about 0.027%). However, the aluminum content in the sintered bar is substantially the same as was present before sintering.

Upon attempting to cold roll the sintered tantalum bar, it breaks.

Bar 3

62.5 grams of the tantalum powder is pressed in the form of a bar under 15 tons/in.² This pressed bar has the following dimensions:

| Thickness: | Inches |
|---|---|
| End | 0.271 |
| Center | 0.262 |
| End | 0.255 |
| Width: | |
| End | 0.254 |
| Center | 0.254 |
| End | 0.254 |
| Length | 6.03 |

The resulting pressed tantalum bar is sintered under a vacuum condition of approximately 0.9 micron, as follows: It is heated slowly to a temperature of about 2100° C. and held at this temperature for 85 minutes, and then heated to a temperature of 2320° C., at which temperature the bar bulges and a portion melts in much the same manner as Bar 2.

*Results.*—The hardness of this bar after sintering is $R_e$=94. (It is to be noted that a tantalum bar having a hardness of $R_e$=94 is much too hard to be cold worked.)

Analysis of the sintered bar showed that the carbon, $SiO_2$ and copper contents are reduced materially: Carbon to about 0.00%, $SiO_2$ to about 0.17%, and copper to about 0.015%. The tungsten content is reduced slightly (to about 0.026%). However, the aluminum content in the sintered bar is substantially the same as was present before sintering.

Upon attempting to cold roll the sintered bar, it breaks.

Bar 4

63.2 grams of the tantalum powder is pressed in the form of a bar under 15 tons/in.² pressure. This pressed bar has the following dimensions:

| Thickness: | Inches |
|---|---|
| End | 0.256 |
| Center | 0.263 |
| End | 0.272 |
| Width: | |
| End | 0.254 |
| Center | 0.254 |
| End | 0.255 |
| Length | 6.03 |

The resulting pressed tantalum bar is sintered under a vacuum condition of approximately 0.9 micron. It is heated to a temperatutre of 2250° C. and held at this temperature for 40 minutes. At the end of this period the bar bulges.

*Results.*—The hardness of this bar after sintering is $R_e$=96. (It is to be noted that a tantalum bar having a hardness of $R_e$=96 is much too hard to be cold worked.)

Analysis of the sintered bar shows that the carbon, $SiO_2$ and copper content is reduced materially: Carbon to 0.00%, $SiO_2$ to approximately 0.2% and copper to about 0.015%. The tungsten content is reduced slightly (to about 0.024%). However, the aluminum content in the sintered bar is substantially the same as was present before sintering.

Upon attempting to cold roll the sintered bar, it breaks.

Bar 5

64.4 grams of a powder mix consisting of 95% of the tantalum powder and 5% copper powder is pressed in the form of a bar under 15 tons/in.² pressure.

This pressed bar has the following dimensions:

| Thickness: | Inches |
|---|---|
| End | 0.269 |
| Center | 0.261 |
| End | 0.258 |
| Width: | |
| End | 0.258 |
| Center | 0.257 |
| End | 0.258 |
| Length | 6.03 |

The resulting pressed bar is sintered under a vacuum condition of 0.9 micron. This bar is heated to a temperature of 2090° C. and held at this temperature for 180 minutes. The resulting sintered bar is cold rolled in one direction at right angles to the length of the bar in a single pass, being reduced 30% in thickness (to 0.160″). The cold rolled bar is then resintered at a temperature of 2140° C. for 148 minutes. Following the second sinter, the bar is then cold rolled in one direction at right angles to the length of the bar to a thickness of 0.004″.

*Results.*—Analysis of the bar after the second sinter shows that it contains the following impurities:

| | Percent |
|---|---|
| Carbon | 0.00 |
| Iron | 0.030 |
| Tungsten | 0.031 |
| $TiO_2$ | 0.010 |
| $SiO_2$ | 0.020 |
| Copper | 0.013 |
| Aluminum | 0.085 |

The resulting tantalum sheet of 0.004″ thickness has no cracks and is sufficiently ductile to be cold rolled into foil.

Bar 6

To 60.61 grams of the tantalum powder is added 3.19 grams of copper powder (5%). After thoroughly mixing the tantalum-copper powder mix, 63.8 grams of this mix is pressed in the form of a bar under 15 tons per square inch pressure.

The pressed bar has the following dimensions:

| Thickness: | Inches |
|---|---|
| End | 0.261 |
| Center | 0.265 |
| End | 0.254 |
| Width: | |
| End | 0.257 |
| Center | 0.255 |
| End | 0.249 |
| Length | 6.03 |

The resulting pressed tantalum bar is sintered under a vacuum condition of approximately 0.8 micron. It is heated at 2090° C. for 180 minutes. The bar is then cold rolled in one direction parallel to the length of the bar to a thickness of 0.160″ in a single pass (a reduction of 30%). The bar is then sintered a second time at a temperature of 2140° C. for approximately 148 minutes, following which it is cold rolled in one direction parallel to the length of the bar to a thickness of 0.004".

*Results.*—The bar after the second sinter contains the following impurities:

| | Percent |
|---|---|
| Carbon | 0.00 |
| Iron | 0.033 |
| Tungsten | 0.021 |
| $TiO_2$ | 0.01 |
| $SiO_2$ | 0.28 |
| Copper | 0.019 |
| Aluminum | 0.150 |

The tantalum sintered bar is sufficiently ductile to be worked under normal conditions.

Bar 7

To 61.28 grams of the tantalum powder, 3.22 grams of copper powder (5%) is added. After thoroughly mixing the tantalum-copper powder mix, 64.5 grams of the mix is pressed in the form of a bar under 15 tons/in.$^2$ pressure. The pressed bar has the following dimensions:

| Thickness: | Inches |
|---|---|
| End | 0.279 |
| Center | 0.270 |
| End | 0.264 |
| Width: | |
| End | 0.254 |
| Center | 0.255 |
| End | 0.256 |
| Length | 6.03 |

The resuting pressed tantalum bar is sintered at 2090° C. for 180 minutes. Following sintering, the bar is cold rolled in a direction parallel to its length to about 0.060" in thickness, then sintered a second time at a temperature of 2140° C. for 148 minutes, following which the resulting bar is cross rolled (cold) to a thickness of 0.004".

*Results.*—The bar after the second sinter has the following impurities:

| | Percent |
|---|---|
| Carbon | 0.00 |
| Iron | 0.012 |
| Tungsten | 0.023 |
| $TiO_2$ | 0.01 |
| $SiO_2$ | 0.13 |
| Copper | 0.0135 |
| Aluminum | 0.065 |

The sintered bar is sufficiently ductile to be worked under normal conditions and the 0.004" thick cold rolled sheet is ductile enough to be cold rolled to foil.

Bar 8

To 74.1 grams of the tantalum powder is added 3.90 grams of copper powder (5%). After thoroughly mixing the tantalum-copper powder mix, 78.0 grams of the mix is pressed in the form of a bar under 15 tons per square inch pressure.

The pressed bar has the following dimensions:

| Thickness: | Inches |
|---|---|
| End | 0.110 |
| Center | 0.110 |
| End | 0.110 |
| Width: | |
| End | 0.625 |
| End | 0.625 |
| Center | 0.625 |
| Length | 7.25 |

The resulting pressed tantalum bar is sintered under a vacuum condition of approximately 0.8 micron. It is heated to a temperature of 2100° C. and held at this temperature for 135 minutes. The bar is then reduced 30% in thickness by cold rolling (one pass of the rolls), following which it is sintered a second time for 120 minutes at 2100° C. under a vacuum condition of 0.7 micron.

The bar is then cold rolled in one direction at right angles to the length thereof to form a sheet 0.004" thick.

*Results.*—This bar, after the second sinter, has the following impurities:

| | Percent |
|---|---|
| Carbon | 0.00 |
| Iron | 0.017 |
| Tungsten | 0.23 |
| $TiO_2$ | 0.01 |
| $SiO_2$ | 0.01 |
| Copper | 0.009 |
| Aluminum | 0.005 |

This sintered bar is sufficiently ductile to be worked under normal conditions and the cold rolled sheet of 0.004" thickness is sufficiently ductile to be rolled to foil.

Bar 9

To 74.29 grams of the tantalum powder is added 3.91 grams of copper powder (5%). After thoroughly mixing the tantalum-copper powder mix, 78.2 grams of the mix is pressed in the form of a bar under 15 tons/in.$^2$ pressure. This pressed bar has the following dimensions:

| Thickness: | Inches |
|---|---|
| End | 0.115 |
| Center | 0.123 |
| End | 0.124 |
| Width: | |
| End | 0.628 |
| Center | 0.630 |
| End | 0.630 |
| Length | 7.25 |

The resulting pressed tantalum bar is sintered under a vacuum condition of approximately 0.7 micron for 135 minutes at 2100° C. The bar is then reduced 30% in thickness by rolling (one pass of the rolls), following which the bar is sintered a second time for 120 minutes at 2100° C. The bar is then cross rolled to 0.004" thick sheet.

*Results.*—The bar, after the second sinter, has the following impurities:

| | Percent |
|---|---|
| Carbon | 0.00 |
| Iron | 0.026 |
| Tungsten | 0.027 |
| $TiO_2$ | 0.010 |
| $SiO_2$ | 0.010 |
| Copper | 0.0096 |
| Aluminum | 0.020 |

The hardness of the bar after the first sinter is $R_e=73$ and after the second sinter $R_e=76$.

The bar is sufficiently ductile to be worked under normal conditions and the cold rolled sheet of 0.004" thickness is capable of being cold rolled to foil.

Bar 10

To 86.13 grams of the tantalum powder is added 0.87 gram of copper powder (1%). After thoroughly mixing the tantalum-copper powder mix, 87.0 grams of the mix is pressed in the form of a bar under 15 tons/in.$^2$ pressure. This pressed bar has the following dimensions:

| Thickness: | Inches |
|---|---|
| End | 0.103 |
| Center | 0.111 |
| End | 0.105 |
| Width: | |
| End | 0.634 |
| Center | 0.636 |
| End | 0.634 |
| Length | 7.5 |

The resulting pressed tantalum bar is sintered under a vacuum condition of approximately 0.7 micron for 120 minutes at 2100° C. The bar is then rolled to 70% of its thickness, following which it is re-sintered for 120 minutes at 2100° C. under a vacuum condition of about 0.7 micron. The resulting bar is then cold rolled to a sheet of 0.005" thickness.

*Results.*—The bar, after the second sinter, has the following impurities:

|  | Percent |
|---|---|
| Carbon | 0.00 |
| Iron | 0.025 |
| Tungsten | 0.025 |
| $TiO_2$ | 0.01 |
| $SiO_2$ | 0.01 |
| Copper | 0.005 |
| Aluminum | 0.034 |

This bar is sufficiently ductile to be worked under normal conditions and cold rolled readily to a sheet thickness of 0.005".

Bar 11

82.9 grams of a powder mix consisting of 95% of the tantalum powder and 5% copper powder is pressed in the form of a bar under 15 tons/in.² pressure. The pressed bar has the following dimensions:

| Thickness: | Inches |
|---|---|
| End | 0.108 |
| Center | 0.114 |
| End | 0.110 |
| Width: |  |
| End | 0.636 |
| Center | 0.637 |
| End | 0.636 |
| Length | 7.5 |

The resulting pressed tantalum bar is sintered at 2100° C. for 120 minutes under a vacuum condition of 0.7 micron. This bar is then cold rolled to 70% of its thickness and sintered a second time at 2100° C. for 120 minutes under a vacuum condition of 0.6 micron. The bar is then cold rolled to a sheet 0.005" thick.

*Results.*—The bar, after the second sinter, has as impurities:

|  | Percent |
|---|---|
| Carbon | 0.00 |
| Iron | 0.025 |
| Tungsten | 0.025 |
| $TiO_2$ | 0.01 |
| $SiO_2$ | 0.01 |
| Copper | 0.005 |
| Aluminum | 0.01 |

The sintered bar is sufficiently ductile to be worked under normal conditions and is cold rolled readily to a sheet 0.005" thick.

Bar 12

84.7 grams of a powder mix consisting of 90% of the tantalum powder and 10% copper powder is pressed in the form of a bar under 15 tons/in.² pressure. The pressed bar has the following dimensions:

| Thickness: | Inches |
|---|---|
| End | 0.109 |
| Center | 0.115 |
| End | 0.113 |
| Width: |  |
| End | 0.634 |
| Center | 0.636 |
| End | 0.634 |
| Length | 7.5 |

The pressed bar is sintered for 120 minutes at 2100° C. under a vacuum condition of 0.6 micron. The resulting sintered bar is then cold rolled to 70% of its thickness, following which it is sintered a second time at 2100° C. for 128 minutes under a vacuum condition of 0.6 micron. Following the second sinter, the bar is cold rolled to a sheet having a thickness of 0.0045". This 0.0045" thick sheet is annealed at 1400° C. for 10 minutes and then cold rolled to 0.0019" thick. After cleaning, it is pack rolled to a sheet 0.007" thick.

*Results.*—The bar, after the second sinter, contains the following impurities:

|  | Percent |
|---|---|
| Carbon | 0.005 |
| Iron | 0.024 |
| Tungsten | 0.023 |
| $TiO_2$ | 0.01 |
| $SiO_2$ | 0.01 |
| Copper | 0.005 |
| Aluminum | 0.020 |

The second sintered bar is sufficiently ductile to be worked under normal conditions and the resulting sheet from this bar exhibits excellent strength and ductility.

Bar 13

About 70 grams of a mixture of the tantalum powder and 5% copper powder is pressed into a bar 6" in length and ¼" square in cross section at a pressure of 15 tons/in.². The bar is sintered under a vacuum condition of 0.7 micron at a temperature of about 2090° C. for about 3 hours. The sintered bar was found to be sound and malleable. The bar is then cold rolled to 70% of its thickness in a single pass and then re-sintered at a temperature of about 2150° C. for approximately 2½ hours under a vacuum condition of 0.8 micron. After the second sintering operation, the bar is satisfactorily cold rolled into a sheet having a thickness of 0.004".

The sheet after completion of the rolling operation contains the following impurities:

|  | Percent |
|---|---|
| Carbon | 0.009 |
| Iron | 0.03 |
| $TiO_2$ | 0.01 |
| $SiO_2$ | 0.02 |
| Copper | 0.014 |
| Aluminum | 0.085 |

The bar after the second sinter is sufficiently ductile to be worked under normal conditions and the resulting sheet from the bar exhibits excellent strength and ductility.

Bar 14

Approximately 70 grams of a mixture of the tantalum powder and 5% copper powder is pressed into a bar 7.25" in length and having a cross section of approximately 0.1" x 0.625" at a pressure of about 15 tons/in.². The bar is sintered at about 2100° C. for 2¼ hours under a vacuum condition of about 0.8 micron. The bar is then cold rolled to 70% of its thickness in a single pass, following which the bar is then re-sintered at 2100° C. for about 2 hours under a vacuum condition of 0.7 micron. The bar is then cold rolled into a sheet having a thickness of 0.004".

The 0.004" thick sheet contained the following impurities:

|  | Percent |
|---|---|
| Carbon | 0.00 |
| Iron | 0.017 |
| $TiO_2$ | 0.01 |
| $SiO_2$ | 0.01 |
| Aluminum | 0.005 |
| Copper | 0.009 |

Bar 15

To 86.13 grams of the tantalum powder is added 0.87 gram of silver powder (1%). After thoroughly mixing the tantalum-silver powder mix, 87.0 grams of the mix is pressed in the form of a bar under 15 tons/in.² pressure. This pressed bar has the following dimensions:

Thickness: Inches
    End _____ 0.103
    Center _____ 0.111
    End _____ 0.105
Width:
    End _____ 0.634
    Center _____ 0.636
    End _____ 0.634
Length _____ 7.5

The resulting pressed tantalum bar is sintered under a vacuum condition of approximately 0.7 micron for 120 minutes at a temperature of 2100° C. under a vacuum condition of about 0.7 micron. The resulting bar is then cold rolled to a sheet of 0.005" thickness.

*Results.*—The bar, after the second sinter, has the following impurities:

| | Percent |
|---|---|
| Carbon | 0.00 |
| Iron | 0.025 |
| Tungsten | 0.025 |
| $TiO_2$ | 0.01 |
| $SiO_2$ | 0.01 |
| Silver | 0.005 |
| Aluminum | 0.034 |

This bar is sufficiently ductile to be worked under normal conditions and cold rolled readily to a sheet thickness of 0.005".

Bar 16

82.9 grams of a powder mix consisting of 95% of the tantalum powder and 5% silver powder is pressed in the form of a bar under 15 tons/in.² pressure. The pressed bar has the following dimensions:

Thickness: Inches
    End _____ 0.108
    Center _____ 0.114
    End _____ 0.110
Width:
    End _____ 0.636
    Center _____ 0.637
    End _____ 0.636
Length _____ 7.5

The resulting pressed tantalum bar is sintered at 2100° C. for 120 minutes under a vacuum condition of 0.7 micron. This bar is then cold rolled to 70% of its thickness and sintered a second time at 2100° C. for 120 minutes under a vacuum condition of 0.6 micron. The bar is then cold rolled to a sheet 0.005" thick.

*Results.*—The bar, after the second sinter, has as impurities:

| | Percent |
|---|---|
| Carbon | 0.00 |
| Iron | 0.025 |
| Tungsten | 0.028 |
| $TiO_2$ | 0.01 |
| $SiO_2$ | 0.01 |
| Silver | 0.005 |
| Aluminum | 0.01 |

The sintered bar is sufficiently ductile to be worked under normal conditions and is cold rolled readily to a sheet 0.005" thick.

Bar 17

84.7 grams of a powder mix consisting of 90% of the tantalum powder and 10% silver powder is pressed in the form of a bar under 15 tons/in.² pressure. The pressed bar has the following dimensions:

Thickness: Inches
    End _____ 0.109
    Center _____ 0.115
    End _____ 0.113
Width:
    End _____ 0.634
    Center _____ 0.636
    End _____ 0.634
Length _____ 7.5

The pressed bar is sintered for 120 minutes at 2100° C. under a vacuum condition of 0.6 micron. The resulting sintered bar is then cold rolled to 70% of its thickness, following which it is sintered a second time at 2100° C. for 128 minutes under a vacuum condition of 0.7 micron. Following the second sinter, the bar is cold rolled to a sheet having a thickness of 0.0045". This 0.0045" thick sheet is annealed at 1400° C. for 10 minutes, and then cold rolled to 0.0019" thick. After cleaning, it is pack rolled to a sheet 0.0007" thick.

*Results.*—The bar, after the second sinter, contains the following impurities:

| | Percent |
|---|---|
| Carbon | 0.005 |
| Iron | 0.024 |
| Tungsten | 0.023 |
| $TiO_2$ | 0.01 |
| $SiO_2$ | 0.01 |
| Silver | 0.005 |
| Aluminum | 0.020 |

The second sintered bar is sufficiently ductile to be worked under normal conditions and the resulting sheets from this bar exhibit excellent strength and ductility.

Bar 18

To 86.13 grams of the tantalum powder is added 0.87 grams of gold powder (1%). After thoroughly mixing the tantalum-gold powder mix, 87.0 grams of the mix is pressed in the form of a bar under 15 tons/in.² pressure. This pressed bar has the following dimensions:

Thickness: Inches
    End _____ 0.103
    Center _____ 0.111
    End _____ 0.105
Width:
    End _____ 0.634
    Center _____ 0.636
    End _____ 0.634
Length _____ 7.5

The resulting pressed tantalum bar is sintered under a vacuum condition of approximately 0.7 micron for 120 minutes at 2100° C. The bar is then cold rolled to 70% of its thickness, following which it is re-sintered for 120 minutes at 2100° C. under a vacuum condition of about 0.7 micron. The resulting bar is then cold rolled to a sheet of 0.005" thickness.

*Results.*—The bar, after the second sinter, has the following impurities:

| | Percent |
|---|---|
| Carbon | 0.00 |
| Iron | 0.025 |
| Tungsten | 0.025 |
| $TiO_2$ | 0.01 |
| $SiO_2$ | 0.01 |
| Gold | 0.005 |
| Aluminum | 0.034 |

This bar is sufficiently ductile to be worked under normal conditions and cold rolled readily to a sheet thickness of 0.005".

Bar 19

82.9 grams of a powder mix consisting of 95% of the tantalum powder and 5% gold powder is pressed in the form of a bar under 15 tons/in.² pressure. The pressed bar has the following dimensions:

Thickness:                                    Inches
    End ------------------------------------- 0.108
    Center ---------------------------------- 0.114
    End ------------------------------------- 0.110
Width:
    End ------------------------------------- 0.636
    Center ---------------------------------- 0.637
    End ------------------------------------- 0.636
Length ---------------------------------------- 7.5

The resulting pressed tantalum bar is sintered at 2100° C. for 120 minutes under a vacuum condition of 0.7 micron. This bar is then cold rolled to 70% of its thickness and sintered a second time at 2100° C. for 120 minutes under a vacuum condition of 0.6 micron. The bar is then cold rolled to a sheet 0.005" thick.

*Results.*—The bar, after the second sinter, has as impurities:

|   | Percent |
|---|---|
| Carbon | 0.00 |
| Iron | 0.025 |
| Tungsten | 0.025 |
| $TiO_2$ | 0.01 |
| $SiO_2$ | 0.01 |
| Gold | 0.005 |
| Aluminum | 0.01 |

The sintered bar is sufficiently ductile to be worked under normal conditions and is cold rolled readily to a sheet 0.005" thick.

Bar 20

84.7 grams of a powder mix consisting of 90% of the tantalum powder and 10% gold powder is pressed in the form of a bar under 15 tons/in.$^2$ pressure. The pressed bar has the following dimensions:

Thickness:                                    Inches
    End ------------------------------------- 0.109
    Center ---------------------------------- 0.115
    End ------------------------------------- 0.113
Width:
    End ------------------------------------- 0.634
    Center ---------------------------------- 0.636
    End ------------------------------------- 0.634
Length ---------------------------------------- 7.5

The pressed bar is sintered for 120 minutes at 2100° C. under a vacuum condition of 0.6 micron. The resulting sintered bar is then cold rolled to 70% of its thickness, following which it is sintered a second time at 2100° C. for 128 minutes under a vacuum condition of 0.6 micron. Following the second sinter, the bar is cold rolled to a sheet having a thickness of 0.0045". This 0.0045" thick sheet is annealed at 1400° C. for 10 minutes, and then cold rolled to 0.0019" thick. After cleaning, it is pack rolled to a sheet 0.0007" thick.

*Results.*—The bar, after the second sinter, contains the following impurities:

|   | Percent |
|---|---|
| Carbon | 0.005 |
| Iron | 0.024 |
| Tungsten | 0.027 |
| $TiO_2$ | 0.01 |
| $SiO_2$ | 0.01 |
| Gold | 0.005 |
| Aluminum | 0.020 |

The second sintered bar is sufficiently ductile to be worked under normal conditions and the resulting sheets from this bar exhibit excellent strength and ductility.

In addition to the foregoing bars, a 21st bar is formed as follows:

Bar 21

73.2 grams of tantalum powder is pressed in the form of a rectangular-shaped bar under 55 tons/in.$^2$ pressure. This tantalum powder does not contain any aluminum, copper, gold or silver, but has the following impurities:

|   | Percent |
|---|---|
| Carbon | 0.015 |
| Iron | 0.018 |
| Tungsten | 0.03 |
| $TiO_2$ | 0.05 |
| $SiO_2$ | 0.05 |

The pressed bar has the following dimensions:

Thickness:                                    Inches
    End ------------------------------------- 0.263
    Center ---------------------------------- 0.265
    End ------------------------------------- 0.267
Width:
    End ------------------------------------- 0.258
    Center ---------------------------------- 0.257
    End ------------------------------------- 0.258
Length ---------------------------------------- 6.03

The resulting pressed tantalum bar is sintered under a vacuum condition of approximately 0.8 micron at a temperature of about 2330° C. for 125 minutes.

The bar is then cold rolled to a sheet 0.004" thick.

*Results.*—The sintered bar contains the following impurities:

|   | Percent |
|---|---|
| Carbon | 0.00 |
| Iron | 0.015 |
| Tungsten | 0.028 |
| $TiO_2$ | 0.05 |
| $SiO_2$ | 0.05 |

The sintered tantalum bar is sufficiently ductile to be cold worked under the normal conditions and the sheet formed from the bar is capable of being cold rolled to foil.

Columbium powder is prepared from potassium columbium oxyfluoride by first reacting the double fluoride with aluminum. The resulting aluminum-columbium intermetallic compound or alloy is then reacted with copper to form an ingot. The resulting ingot includes an aluminum-copper alloy having columbium particles dispersed therethrough. The columbium is recovered from the ingot by treating the ingot with hydrochloric acid and washing and drying the columbium powder. This powder contains the following impurities:

|   | Percent |
|---|---|
| Carbon | 0.18 |
| Iron | 0.06 |
| Tungsten | 0.02 |
| $TiO_2$ | 0.02 |
| $SiO_2$ | 0.60 |
| Copper | 0.71 |
| Aluminum | 1.24 |

Following are examples of pressed, sintered and cold rolled columbium bars made from the above described powder:

Bar 22

To 43.07 grams of the columbium powder is added 0.43 grams (1%) of copper powder. After thoroughly mixing the columbium-copper powder mix, the powder mix is pressed in the form of a bar under 15 tons/in.$^2$ pressure. This pressed bar has the following dimensions:

Thickness:                                    Inches
    End ------------------------------------- 0.101
    Center ---------------------------------- 0.111
    End ------------------------------------- 0.104
Width:
    End ------------------------------------- 0.635
    Center ---------------------------------- 0.637
    End ------------------------------------- 0.635
Length ---------------------------------------- 7.5

The resulting pressed columbium bar is sintered under a vacuum condition of approximately 0.6 micron for 6 hours at 1800° C. The bar is then cold rolled to 60% of its thickness, following which it is re-sintered for 3 hours at 1800° C. under a vacuum condition of 0.7 micron. The resulting bar is then cold rolled to a sheet of 0.008" thickness.

Results.—The bar after the second sinter contains the following impurities:

|  | Percent |
|---|---|
| Carbon | 0.003 |
| Iron | 0.040 |
| Tungsten | 0.02 |
| $TiO_2$ | 0.01 |
| $SiO_2$ | 0.01 |
| Copper | 0.007 |
| Aluminum | 0.031 |

This bar is sufficiently ductile to be worked under normal conditions and is readily cold rolled to a sheet thickness of .008".

Bar 23

42.85 grams of a powder mix consisting of 90% by weight of the columbium powder and 10% by weight of copper powder is pressed in the form of a bar under 15 ton/in.² pressure. The pressed bar has the following dimensions:

| Thickness: | Inches |
|---|---|
| End | 0.111 |
| Center | 0.114 |
| End | 0.113 |
| Width: | |
| End | 0.633 |
| Center | 0.635 |
| End | 0.633 |
| Length | 7.5 |

The pressed bar is sintered for 6 hours at a temperature of about 1810° C. under a vacuum condition of 0.7 micron. The resulting sintered bar is then cold rolled to 60% of its thickness, following which it is re-sintered at 1800° C. for 3 hours under a vacuum condition of 0.7 micron. Following the second sinter, the bar is cold rolled to 0.005" thickness.

Results.—The bar, after the second sinter, contains the following impurities:

|  | Percent |
|---|---|
| Carbon | 0.003 |
| Iron | 0.023 |
| Tungsten | 0.018 |
| $TiO_2$ | 0.01 |
| $SiO_2$ | 0.01 |
| Copper | 0.009 |
| Aluminum | 0.020 |

The second sintered bar is sufficiently ductile to be worked under normal conditions and the resulting sheet from the bar possesses excellent strength and ductility.

Bar 24

42.0 grams of a powder mix consisting of 95% by weight of the columbium powder and 5% by weight of copper powder is pressed in the form of a bar under 15 ton/in.² pressure. The pressed bar has the following dimensions:

| Thickness: | Inches |
|---|---|
| End | 0.109 |
| Center | 0.115 |
| End | 0.110 |
| Width: | |
| End | 0.635 |
| Center | 0.637 |
| End | 0.636 |
| Length | 7.5 |

The resulting pressed columbium bar is sintered at a temperature of 1800° C. for 6 hours under a vacuum condition of 0.7 micron. This bar is then cold rolled to 65% of its thickness and sintered a second time at a temperature of 1800° C. for 3½ hours under a vacuum condition of 0.6 micron. The bar is then cold rolled to a sheet of 0.008" thickness.

Results.—The bar, after the second sinter, contains the following impurities:

|  | Percent |
|---|---|
| Carbon | 0.004 |
| Iron | 0.024 |
| Tungsten | 0.015 |
| $TiO_2$ | 0.01 |
| $SiO_2$ | 0.01 |
| Copper | 0.006 |
| Aluminum | 0.028 |

The bar is sufficiently ductile to be worked under normal conditions and is cold rolled to a sheet 0.008" thick.

Bar 25

32.0 grams of the columbium powder is pressed in the form of a bar under 15 tons/in.² pressure. The pressed bar has the following dimensions:

| Thickness: | Inches |
|---|---|
| End | 0.255 |
| Center | 0.264 |
| End | 0.273 |
| Width: | |
| End | 0.254 |
| Center | 0.253 |
| End | 0.255 |
| Length | 6.03 |

The resulting pressed columbium bar is sintered at a temperature of 1800° C. for 2½ hours under a vacuum condition of 0.7 micron. At the end of this period, the bar bulged and a portion melts. Upon attempting to cold roll the bar, it breaks.

Results.—Analysis of the sintered bar showed that the carbon, $SiO_2$ and copper contents are reduced materially: carbon to 0.003%, $SiO_2$ to about 0.2% and copper to about 0.015%. The tungsten content is reduced slightly (to about 0.019%). However, the aluminum content in the sintered bar is substantially the same as was present before sintering.

Bar 26

To 43.1 grams of columbium powder is added 0.43 gram (1%) of silver powder. After thoroughly mixing the columbium-silver powder mix, the powder mix is pressed in the form of a bar under 15 tons/in.² pressure. This pressed bar has the following dimensions:

| Thickness: | Inches |
|---|---|
| End | 0.110 |
| Center | 0.111 |
| End | 0.109 |
| Width: | |
| End | 0.636 |
| Center | 0.637 |
| End | 0.636 |
| Length | 7.5 |

The resulting pressed columbium bar is sintered under a vacuum condition of approximately 0.7 micron for 6 hours at 1800° C. The bar is then cold rolled to 60% of its thickness following which it is re-sintered for 3 hours at 1800° C. under a vacuum condition of 0.6 micron. The resulting bar is then cold rolled to a sheet of 0.008" thickness.

Results.—The bar, after the second sintering, contains the following impurities:

|  | Percent |
|---|---|
| Carbon | 0.004 |
| Iron | 0.042 |
| Tungsten | 0.02 |
| $TiO_2$ | 0.01 |
| $SiO_2$ | 0.01 |
| Silver | 0.008 |
| Aluminum | 0.042 |

This bar is sufficiently ductile to be worked under normal conditions and is readily cold rolled to a sheet thickness of 0.008".

Bar 27

42.9 grams of a powder mix consisting of 90% columbium powder and 10% silver powder is pressed in the form of a bar under 15 tons/in.² pressure. This pressed bar has the following dimensions:

| Thickness: | Inches |
|---|---|
| End | 0.112 |
| Center | 0.114 |
| End | 0.110 |
| Width: | |
| End | 0.633 |
| Center | 0.637 |
| End | 0.634 |
| Length | 7.5 |

The pressed bar is sintered for 6 hours at a temperature of 1805° C. under a vacuum condition of 0.7 micron. The resulting sintered bar is then cold rolled to 60% of its thickness, following which it is re-sintered at 1800° C. for 3 hours under a vacuum condition of 0.8 micron.

Following the second sinter, the bar is cold rolled to 0.005" thickness.

*Results.*—The bar, after the second sinter, contains the following impurities:

| | Percent |
|---|---|
| Carbon | 0.03 |
| Iron | 0.024 |
| Tungsten | 0.02 |
| $TiO_2$ | 0.01 |
| $SiO_2$ | 0.01 |
| Silver | 0.007 |
| Aluminum | 0.022 |

The second sintered bar is sufficiently ductile to be worked under normal conditions and the resulting sheet from the bar possesses excellent strength and ductility.

Bar 28

43 grams of a powder mix consisting of 95% by weight of columbium powder and 5% of silver is pressed in the form of a bar under 15 tons/in.² pressure. The pressed bar has the following dimensions:

| Thickness: | Inches |
|---|---|
| End | 0.110 |
| Center | 0.116 |
| End | 0.111 |
| Width: | |
| End | 0.635 |
| Center | 0.636 |
| End | 0.636 |
| Length | 7.5 |

The resulting pressed columbium bar is sintered at 1800° C. for 6 hours under a vacuum condition of 0.7 micron. This bar is then cold rolled to 65% of its thickness and sintered a second time at a temperature of 1800° C. for 3½ hours under a vacuum condition of 0.6 micron. The bar is then cold rolled to 0.008" thickness.

*Results.*—The bar, after the second sinter, contains the following impurities:

| | Percent |
|---|---|
| Carbon | 0.004 |
| Iron | 0.025 |
| Tungsten | 0.028 |
| $TiO_2$ | 0.01 |
| $SiO_2$ | 0.01 |
| Silver | 0.007 |
| Aluminum | 0.030 |

The bar is sufficiently ductile to be worked under normal conditions and is cold rolled to a sheet 0.008" thick.

Bar 29

To 43.5 grams of the columbium powder is added 0.43 grams (1%) of gold powder. After thoroughly mixing the columbium-gold powder mix, the powder mix is pressed in the form of a bar under 15 tons/in.² pressure. This pressed bar has the following dimensions:

| Thickness: | Inches |
|---|---|
| End | 0.110 |
| Center | 0.112 |
| End | 0.111 |
| Width: | |
| End | 0.636 |
| Center | 0.637 |
| End | 0.636 |
| Length | 7.5 |

The resulting pressed columbium bar is sintered under a vacuum condition of approximately 0.7 micron for 6 hours at 1800° C. The bar is then cold rolled to 60% of its thickness, following which it is re-sintered for 3 hours at 1800° C. under a vacuum condition of 0.7 micron. The resulting bar is then cold rolled to a sheet of 0.009" thickness.

*Results.*—The bar, after the second sintering, contains the following impurities:

| | Percent |
|---|---|
| Carbon | 0.004 |
| Iron | 0.042 |
| Tungsten | 0.018 |
| $TiO_2$ | 0.01 |
| $SiO_2$ | 0.01 |
| Gold | 0.009 |
| Aluminum | 0.030 |

This bar is sufficiently ductile to be worked under normal conditions and is readily cold rolled to a sheet thickness of 0.009".

Bar 30

43.0 grams of a powder mix consisting of 90% by weight of columbium powder and 10% by weight of gold powder is pressed in the form of a bar under 15 tons/in.² pressure. The pressed bar has the following dimensions:

| Thickness: | Inches |
|---|---|
| End | 0.110 |
| Center | 0.115 |
| End | 0.113 |
| Width: | |
| End | 0.633 |
| Center | 0.635 |
| End | 0.634 |
| Length | 7.5 |

The pressed bar is sintered for 6 hours at a temperature of about 1800° C. under a vacuum condition of 0.8 micron. The resulting sintered bar is then cold rolled to 60% of its thickness, following which it is re-sintered at 1800° C. for 3 hours under a vacuum condition of 0.7 micron. Following the second sinter, the bar is cold rolled to 0.005" thickness.

*Results.*—The bar, after the second sinter, contains the following impurities:

| | Percent |
|---|---|
| Carbon | 0.003 |
| Iron | 0.025 |
| Tungsten | 0.017 |
| $TiO_2$ | 0.01 |
| $SiO_2$ | 0.01 |
| Gold | 0.008 |
| Aluminum | 0.021 |

The second sintered bar is sufficiently ductile to be worked under normal conditions and the resulting sheet from the bar possesses excellent strength and ductility.

Bar 31

43.0 grams of a powder mix consisting of 95% by weight of the columbium powder and 5% by weight of gold powder is pressed in the form of a bar under 15 tons/in.² pressure. The pressed bar has the following dimensions:

Thickness: Inches
  End _____ 0.110
  Center _____ 0.115
  End _____ 0.111
Width:
  End _____ 0.635
  Center _____ 0.637
  End _____ 0.635
Length _____ 7.5

The resulting pressed columbium bar is sintered at a temperature of 1800° C. for 3½ hours under a vacuum condition of 0.8 micron. This bar is then cold rolled to 65% of its thickness and sintered a second time at a temperature of 1800° C. for 3½ hours under a vacuum condition of 0.6 micron. The bar is then cold rolled to a sheet of 0.008" thickness.

*Results.*—The bar, after the second sinter, contains the following impurities:

|  | Percent |
|---|---|
| Carbon | 0.003 |
| Iron | 0.025 |
| Tungsten | 0.018 |
| TiO₂ | 0.11 |
| SiO₂ | 0.01 |
| Gold | 0.006 |
| Aluminum | 0.028 |

The bar is sufficiently ductile to be worked under normal conditions and is cold rolled to a sheet 0.008" thick.

Bar 32

37 grams of columbium powder is pressed in the form of a rectangular-shaped bar under 55 tons/in.² pressure. This columbium powder does not contain any aluminum or copper, but does contain the following impurities:

|  | Percent |
|---|---|
| Carbon | 0.020 |
| Iron | 0.015 |
| Tungsten | 0.03 |
| TiO₂ | 0.05 |
| SiO₂ | 0.05 |

The pressed bar has the following dimensions:

Thickness: Inches
  End _____ 0.264
  Center _____ 0.265
  End _____ 0.263
Width:
  End _____ 0.258
  Center _____ 0.256
  End _____ 0.258
Length _____ 6.05

The resulting pressed columbium bar is sintered under a vacuum condition of 0.7 micron for a period of 6 hours at a temperature of 1800° C.

The bar is then cold rolled to a sheet 0.004" thick.

*Results.*—The sintered bar contains the following impurities:

|  | Percent |
|---|---|
| Carbon | 0.003 |
| Iron | 0.015 |
| Tungsten | 0.028 |
| TiO₂ | 0.02 |
| SiO₂ | 0.03 |

The sintered columbium bar is sufficiently ductile to be cold rolled to foil.

It is important to note that the results of the tests conducted on Bars 1, 2, 3, 4 and 25 clearly show that the presence of a small amount of aluminum in tantalum or columbium powder, as for example 0.87% in tantalum and 1.24% in columbium, causes embrittlement of a vacuum sintered tantalum or columbium bar made from such powder and renders the resulting vacuum sintered bar non-workable under normal commercial procedures. In addition, the results of the tests conducted on Bars 1, 2, 3, 4 and 25 show that it is impossible to remove the embrittling quantity of aluminum from the pressed tantalum or columbium bar by sintering such bars under a high vacuum condition, since these bars had substantially the same amount of aluminum after sintering under high vacuum conditions as was present before sintering.

The results of the tests conducted on Bars 5 to 20, 22, 23, 24 and 26 to 31 clearly show that the addition of copper, silver or gold to tantalum or columbium powder containing an embrittling quantity of aluminum results in volatilization of the copper, silver or gold along with the embrittling quantity of aluminum from the tantalum or columbium bar during sintering to render the resulting sintered tantalum or columbium bar sufficiently ductile to be worked under normal conditions.

Having described our invention as related to the embodiments set out in the accompanying examples, it is our intention that the invention be not limited by any of the details of description unless otherwise specified, but rather be construed broadly within its spirit and scope as set out in the accompanying claims.

We claim:

1. The method of purifying tantalum powder containing as an impurity an embrittling quantity of up to about 2% of aluminum, which comprises: mixing with the said tantalum a third metal powder selected from the class consisting of copper, silver and gold; and heating the metal powder mix at a temperature of at least the sintering temperature of the tantalum, the amount of the selected third metal added being sufficient to react and volatilize off with the embrittling quantity of aluminum during sintering to render the sintered tantalum sufficiently ductile to be worked.

2. The method as set forth in claim 1 wherein the third metal is copper.

3. The method of purifying columbium powder containing as an impurity an embrittling quantity of up to about 2% of aluminum, which comprises: mixing with the said columbium a third metal powder selected from the class consisting of copper, silver and gold; and heating the metal powder mix at a temperature of at least the sintering temperature of the columbium, the amount of the selected third metal added being sufficient to react and volatilize off with the embrittling quantity of aluminum during sintering to render the sintered columbium sufficiently ductile to be worked.

4. The method as set forth in claim 3 wherein the third metal is copper.

5. The method of purifying tantalum containing as an impurity an embrittling amount of up to about 2% of aluminum preventing the resulting sintered metal from being sufficiently ductile to be worked, which comprises: mixing with finely divided particles of the said impure tantalum an amount of finely divided copper, corresponding to from about 1% to about 10% by weight of the mixture; pressing the mixture into a compact; and heating the said compact at a temperature of at least the sintering temperature of the tantalum; thereby volatilizing the copper with the embrittling amount of aluminum to render the sintered tantalum sufficiently ductile to be worked.

6. The method of purifying columbium containing as an impurity an embrittling amount of up to about 2% of aluminum preventing the resulting sintered metal from being sufficiently ductile to be worked, which comprises: mixing with finely divided particles of the said impure columbium an amount of finely divided copper, corresponding to from about 1% to about 10% by weight of the mixture; pressing the mixture into a compact; and heating the said compact at a temperature of at least the sintering temperature of the columbium, thereby volatilizing the copper with the embrittling amount of aluminum to render the sintered columbium sufficiently ductile to be worked.

7. The method of purifying tantalum containing as an impurity an embrittling quantity of up to about 2% by weight of aluminum, which comprises: mixing with finely divided particles of the said impure tantalum an amount of finely divided particles of a third metal selected from the class consisting of copper, silver and gold corresponding to from about 1% to about 10% by weight of the mixture; pressing the mixture into a compact; and heating the said compact at a temperature of at least the sintering temperature of the tantalum, thereby volatilizing the selected third metal and the aluminum to render the sintered tantalum sufficiently ductile to be worked.

8. The method of purifying columbium containing as an impurity an embritling quantity of up to about 2% by weight of aluminum, which comprises: mixing with finely divided particles of the said impure columbium an amount of finely divided particles of a third metal selected from the class consisting of copper, silver and gold corresponding to from about 1% to about 10% by weight of the mixture; pressing the mixture into a compact; and heating the said compact at a temperature of at least the sintering temperature of the columbium, thereby volatilizing the selected third metal and the aluminum to render the sintered columbium sufficiently ductile to be worked.

9. The method of purifying tantalum containing as an impurity from about 0.5% to about 2% by weight of aluminum, which comprises: mixing with finely divided particles of the said impure tantalum an amount of finely divided particles of a third metal selected from the class consisting of copper, silver and gold corresponding to about 1% to 10% by weight of the mixture; pressing the mixture into a compact; and heating the said compact at a temperature of at least the sintering temperature of the tantalum, thereby volatilizing substantially all of the selected third metal and the aluminum to render the sintered tantalum sufficiently ductile to be worked.

10. The method of purifying columbiun containing as an impurity from about 0.5% to about 2% by weight of aluminum, which comprises: mixing with finely divided particles of the said impure columbium an amount of finely divided particles of a third metal selected from the class consisting of copper, silver and gold corresponding to about 1% to 10% by weight of the mixture; pressing the mixture into a compact; and heating the said compact at a temperature of at least the sintering temperature of the columbium, thereby volatilizing substantially all of the selected third metal and the aluminum to render the sintered columbium sufficiently ductile to be worked.

11. The method of purifying tantalum containing as an impurity an embrittling quantity of up to about 2% by weight of aluminum, which comprises: mixing with finely divided particles of the said impure tantalum an amount of finely divided particles of a third metal selected from the class consisting of copper, silver and gold corresponding to from about 1% to about 10% by weight of the mixture; and heating the said mixture at a temperature of at least the sintering temperature of the tantalum, thereby volatilizing the selected third metal and the aluminum to render the sintered tantalum sufficiently ductile to be worked.

12. The method of purifying columbium containing as an impurity an embrittling quantity of up to about 2% by weight of aluminum, which comprises: mixing with finely divided particles of the said impure columbium an amount of finely divided particles of a third metal selected from the class consisting of copper, silver and gold corresponding to from about 1% to about 10% by weight of the mixture; and heating the said mixture at a temperature of at least the sintering temperature of the columbium, thereby volatilizing the selected third metal and the aluminum to render the sintered columbium sufficiently ductile to be worked.

13. The method of purifying a refractory metal containing as an impurity an embrittling quantity of up to about 2% by weight of aluminum, which comprises: mixing with finely divided particles of the said impure refractory metal an amount of finely divided particles of a third metal selected from the class consisting of copper, silver and gold corresponding to from about 1% to about 10% by weight of the mixture; and heating the said mixture at a temperature of about the sintering temperature of the refractory metal, thereby volatilizing the selective third metal and the aluminum to render the refractory metal sufficiently ductile to be worked.

14. The method of purifying a refractory metal powder containing as an impurity an embrittling quantity of up to about 2% of aluminum, which comprises: mixing with the said refractory metal powder a third metal powder selected from the class consisting of copper, silver and gold; and heating the metal powder mix at a temperature of about the sintering temperature of the refractory metal, the amount of the selected third metal added being sufficient to react and volatilize off with the embrittling quantity of aluminum during heating to render the refractory metal sufficiently ductile to be worked.

15. The method of purifying a powdered refractory metal selected from the class consisting of tungsten, molybdenum, tantalum and columbium containing as an impurity an embrittling quantity of up to about 2% of aluminum, which comprises: mixing with the selected powdered refractory metal a third metal powder selected from the class consisting of copper, silver and gold; and heating the metal powder mix at a temperature of about the sintering temperature of the selected refractory metal, the amount of the selected third metal added being sufficient to react and volatilize off with the embrittling quantity of aluminum during heating to render the refractory metal sufficiently ductile to be worked.

No references cited.